(12) United States Patent
Zhao et al.

(10) Patent No.: US 9,702,760 B2
(45) Date of Patent: Jul. 11, 2017

(54) OPTICAL MODULE, ELECTRONIC APPARATUS, AND METHOD OF DRIVING OPTICAL MODULE

(71) Applicant: Seiko Epson Corporation, Tokyo (JP)

(72) Inventors: Danjun Zhao, Fujimi (JP); Tetsuo Tatsuda, Ina (JP); Shinichi Arazaki, Fujimi (JP)

(73) Assignee: Seiko Epson Corporation (JP)

( * ) Notice: Subject to any disclaimer, the term of this patent is extended or adjusted under 35 U.S.C. 154(b) by 203 days.

(21) Appl. No.: 14/580,770

(22) Filed: Dec. 23, 2014

(65) Prior Publication Data

US 2015/0185080 A1  Jul. 2, 2015

(30) Foreign Application Priority Data

Dec. 27, 2013  (JP) .................................. 2013-270761

(51) Int. Cl.
*G01J 3/28* (2006.01)
*G01J 3/02* (2006.01)
(Continued)

(52) U.S. Cl.
CPC ............. *G01J 3/2803* (2013.01); *G01J 3/027* (2013.01); *G01J 3/26* (2013.01); *G01J 3/42* (2013.01)

(58) Field of Classification Search
CPC .. G01J 3/2803; G01J 3/42; G01J 3/027; G01J 3/32; G01J 3/26
See application file for complete search history.

(56) References Cited

U.S. PATENT DOCUMENTS 8,237,835 B1 * 8/2012 Muller ...................... 250/201.9
2001/0052977 A1  12/2001 Toyooka
(Continued)

FOREIGN PATENT DOCUMENTS

CN   102135662 A   7/2011
JP   2000-152254 A   5/2000
(Continued)

OTHER PUBLICATIONS

J. Li et al., "Implementation method of real color TDI-CMOS image sensor based on digital domain", Transducer and Microsystem Technologies 4 (2013), pp. 88-90 and 94.

*Primary Examiner* — Kara E Geisel
*Assistant Examiner* — Violeta A Prieto
(74) *Attorney, Agent, or Firm* — Harness, Dickey & Pierce, P.L.C.

(57) ABSTRACT

A spectrometry apparatus includes a wavelength variable interference filter emitting light of various predetermined wavelengths; a roll shutter imaging element having pixels accumulating electric charges when exposed to light, and forming one frame by photodetection for each pixel block including pixels with a predetermined time delay for each pixel block, in which the imaging element accumulates electric charges in a photodetection period, and outputs a detection signal in response to the accumulated electric charges in a non-photodetection period; and a spectroscopic controller controlling the wavelength change driving of the emitted light of the wavelength variable interference filter. For the one frame, the spectroscopic controller starts the wavelength change driving at an end timing of the photodetection period of a final pixel block for which the photodetection process is performed at the end.

8 Claims, 10 Drawing Sheets

(51) Int. Cl.
*G01J 3/26* (2006.01)
*G01J 3/42* (2006.01)

(56) References Cited

U.S. PATENT DOCUMENTS

| | | | |
|---|---|---|---|
| 2011/0176128 A1 | 7/2011 | Matsuno | |
| 2012/0069214 A1* | 3/2012 | Shiohara | H04N 5/217 348/229.1 |
| 2013/0114083 A1* | 5/2013 | Sano | G02B 26/001 356/416 |
| 2013/0148013 A1* | 6/2013 | Shiohara | H04N 5/2353 348/362 |
| 2014/0371535 A1* | 12/2014 | Seto | A61B 1/0661 600/160 |
| 2015/0062377 A1* | 3/2015 | Wong | H04N 5/378 348/231.99 |
| 2015/0185074 A1* | 7/2015 | Zhao | G01J 3/027 356/326 |
| 2016/0116336 A1* | 4/2016 | Zhao | G01J 3/26 250/205 |

FOREIGN PATENT DOCUMENTS

| | | |
|---|---|---|
| JP | 3297737 B2 | 7/2002 |
| JP | 2010-096913 A | 4/2010 |
| JP | 2012-013715 A | 1/2012 |
| JP | 2013-017507 A | 1/2013 |

\* cited by examiner

OPTICAL MODULE, ELECTRONIC APPARATUS, AND METHOD OF DRIVING OPTICAL MODULE

BACKGROUND

1. Technical Field

The present invention relates to an optical module, an electronic apparatus, and a method of driving the optical module.

2. Related Art

The related art (for example, JP-A-2013-17507) discloses a spectrometry apparatus as an electronic apparatus including a spectroscopic element that can extract light of a predetermined wavelength from incident light and can change the extracted wavelength, and an imaging element that photodetects the light extracted by the spectroscopic element, and in which the spectrometry apparatus performs a spectroscopic measurement by detecting the amount of light photodetected by the imaging element.

JP-A-2013-17507 discloses a spectroscopic imaging apparatus (spectrometry apparatus) including an imaging element that alternates a light shielding period and a light exposure period; a spectroscopic element that can change an interplanar spacing of facing optical substrates; and an interplanar spacing control unit that controls the interplanar spacing.

In the apparatus disclosed in JP-A-2013-17507, the interplanar spacing control unit outputs a control signal, and controls the spectroscopic element to end an operation of changing the interplanar spacing at the end of a predetermined light shielding period of the imaging element, while taking account of the fact that the spectroscopic element starts and ends the changing operation at delayed timings with respect to an output timing of the control signal.

However, in the apparatus disclosed in JP-A-2013-17507, the predetermined light shielding period is set to be much longer than the changing operation regardless of the time required for the changing operation. For this reason, a measurement time increases by the time from the start of the light shielding period to the start of the changing operation.

The technology disclosed in JP-A-2013-17507 does not take account of a case in which a rolling shutter-type imaging element is provided that includes a plurality of pixel rows, drives each of the pixels rows at a different timing, and outputs a detection signal. That is, in the rolling shutter type imaging element, each of the pixel rows is driven at a different timing, and the amount of light exposure for two frames may be concurrently detected.

That is, initially, the pixel rows perform a photodetection process for a first frame, and immediately after that process, start a photodetection process for a second frame subsequent to the first frame. At this time, the pixel rows exist that continue to perform the photodetection process for the first frame.

Accordingly, when the spectroscopic element is driven without taking the drive timing for a photodetector element into consideration, as described above, the spectroscopic element may be driven at a time when the amount of light exposure for two frames is concurrently detected. At this time, both of the first and second frames becomes an invalid frame from which it is not possible to detect the amount of light exposure in a state where the set wavelength of the spectroscopic element is set to be the same for the entirety of the pixel rows, and it is not possible to acquire a high-precision spectroscopic image. The detection of the amount of light exposure for a third frame subsequent to the invalid second frame is started after the driving of the spectroscopic element is completed, and the third frame becomes a valid frame. As such, when the spectroscopic element is driven without taking the drive timing for the photodetector element into consideration, the invalid first and second frames are in succession, and a measurement time increases.

SUMMARY

An advantage of some aspects of the invention is to provide an optical module, an electronic apparatus, and a method of driving an optical module which can reduce a measurement time.

An aspect of the invention is directed to an optical module including: a spectroscopic element that selects light of a predetermined wavelength from incident light, and can change the wavelength of the light that is to be emitted as emitted light; a roll shutter-type imaging element that has pixels which accumulates electric charges while being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period; and a spectroscopic control unit (controller) that controls the wavelength change driving of the emitted light in the spectroscopic element. For the one frame, the spectroscopic control unit controls the spectroscopic element to start the wavelength change driving at an end timing of the photodetection period of a final pixel block for which the photodetection process is performed at the end.

According to the aspect of the invention, the spectroscopic element starts the wavelength change driving of the rolling shutter-type imaging element at the end timing of the photodetection period of the final pixel block for one-frame image.

That is, the imaging element performs the photodetection process for each of the pixels, which includes the photodetection period in which electric charges are accumulated in response to the amount of light exposure, and the non-photodetection period in which the accumulated electric charges are output and reset as one set. At this time, the rolling shutter type is adopted in which the photodetection process is performed for each pixel block with the predetermined time delay for each pixel block. In the optical module, when one-frame image is captured, the spectroscopic element starts the wavelength change driving at the end timing (that is, a start timing of the non-photodetection period, and an output timing of the detection signal) of the photodetection period of the final pixel block.

According to the aspect of the invention, it is possible to perform the wavelength change driving at the end of the photodetection period of the final pixel block for a valid frame, that is, when the photodetection periods of the entirety of the pixel blocks end, and an appropriate amount of light exposure can be acquired in a state where the spectroscopic element is set to emit light of a predetermined wavelength. Accordingly, it is possible to reduce a time from the end of the photodetection period of the final pixel block to the end of the wavelength change driving for the valid frame, that is, the time required for changing the wavelength, and it is possible to reduce a measurement time.

In the rolling shutter-type imaging element, the time required for the transmission of electric charges (electric charge transmission time) and the amount of delay in photodetection period between the pixel rows are typically less than the length of the photodetection period or a drive time. When the non-photodetection period is to the extent of the electric charge transmission time, and the wavelength change driving is started at the end timing of the photodetection period of the final pixel block for a certain frame, the photodetection period of a first pixel block for a subsequent frame has already started.

For example, in a case where the rolling shutter-type imaging element is driven over a plurality of frames (hereinafter, a frame A, a frame B, and a frame C are acquired in sequence, and the frame A is a valid frame), even when the wavelength change driving is started at the end of the photodetection period of the final pixel block of the valid frame A, the frame B becomes an invalid frame.

Here, when the spectroscopic element starts the wavelength change driving without taking the start timing and end timing of the photodetection period and the non-photodetection period of the imaging element into consideration, an unnecessary time may occur between the end of the photodetection period of the final pixel block and the start of the wavelength change driving for the valid frame A. At this time, the time from the end of the photodetection period of the final pixel block to the end of the wavelength change driving for the valid frame A increases, and two invalid frames are likely to consecutively occur. That is, when the spectroscopic element is driven when the photodetection process for each of the frames B and C is performed, both of the frames B and C become invalid frames.

In contrast, according to the aspect of the invention, since it is possible to reduce the time from the end of the photodetection period of the final pixel block to the end of the wavelength change driving for the valid frame A, the wavelength change driving is not ended before the start of the photodetection period of the first pixel block of the frame C, and it is possible to prevent both of the frames B and C from becoming invalid frames. That is, it is possible to prevent two consecutive frames from becoming invalid, and reduce a measurement time.

According to the aspect of the invention, the drive time indicates a time from when the spectroscopic element is driven to when emitted light of a predetermined wavelength is stably (when the amount of variation of the wavelength falls into a range of predetermined threshold values) emitted. For example, when a wavelength variable Fabry-Perot etalon is used as the spectroscopic element, which obtains emitted light of a predetermined wavelength by varying a gap between a pair of reflective films, the drive time is a time from when the variation of the gap between the reflective films starts to when the amount of variation of the gap between the reflective films falls into the range of predetermined threshold values.

In the optical module according to the aspect of the invention, it is preferable that an end timing of the non-photodetection period of a first pixel block for which the photodetection process is initially performed in a second frame subsequent to a first frame comes after an end timing of the wavelength change driving that is started along with the end of the photodetection period of the final pixel block for the first frame.

According to the aspect of the invention with this configuration, the end timing of the non-photodetection period subsequent to the photodetection period of the first pixel block for the second frame subsequent to the first frame comes after the end timing of the wavelength change driving that is started at the end timing of the photodetection period of the final pixel block for the first frame.

That is, the wavelength change driving is started at the end timing of the photodetection period of the final pixel block for the valid frame A. The timing of each of the photodetection period, the non-photodetection period and the wavelength change driving is set in such a manner that the photodetection period of the first pixel block for the frame C starts after the end timing of the wavelength change driving.

Accordingly, it is possible to make the frame A and the frame C become valid, with the invalid frame B interposed therebetween. At this time, as described above, it is possible to more reliably reduce a measurement time without the occurrence of two or more consecutive invalid frames as described above.

Even when the wavelength of the light emitted from the spectroscopic element is changed, it is possible to drive the imaging element and the spectroscopic element in such a manner that a valid frame and an invalid frame occur alternately. For this reason, it is possible to reduce a processing load without determining whether the frame is valid or invalid.

It is possible to more reliably prevent a decrease in measurement accuracy without performing the wavelength change driving during the photodetection period for the valid frame.

In the optical module according to the aspect of the invention, it is preferable that an end timing of the non-photodetection period of the first pixel block for the second frame is a time when the photodetection period of the final pixel block for the first frame ends and then a longest drive time among the drive times required for the wavelength change driving elapses.

According to the aspect of the invention with this configuration, the end timing of the non-photodetection period of the first pixel block for the second frame is a time when the photodetection period of the final pixel block for the first frame ends and then the longest drive time elapses among the drive times required for the wavelength change driving.

That is, the photodetection period of the first pixel block for the frame C starts when the photodetection period of the final pixel block for the valid frame A ends and then the longest drive time among the drive times required for the wavelength change driving elapses. At this time, it is possible to further reduce a measurement time by setting a time from the end timing of the photodetection period of the final pixel block for the valid frame A to the start of the frame C which is a subsequent valid frame to the longest drive time among the drive times.

In the optical module according to the aspect of the invention, it is preferable that the longest drive time is the longest one among the drive times for the wavelength change driving in which the amount of changing the wavelength is a predetermined amount or less.

According to the aspect of the invention with this configuration, the end timing of the non-photodetection period of the first pixel block for the second frame is set to a time when the photodetection period of the final pixel block for the first frame ends and then the longest drive time among the drive times required for the wavelength change driving elapses, in which the amount of changing the wavelength is a predetermined amount or less.

That is, the photodetection period of the first pixel block for the frame C starts when the photodetection period of the final pixel block for the valid frame A ends and then the longest drive time among the drive times required for the wavelength change driving elapses, which corresponds to a predetermined drive amount or less. Accordingly, a drive time, when a wavelength is changed in a plurality of wavelengths, and the amount of changing the wavelength exceeds a predetermined amount, is not included in setting the start timing of the photodetection period of the first pixel block for the frame C. For this reason, it is possible not to set the drive time exceeding the predetermined time to the longest drive time, and it is possible to reduce the time required for acquiring one frame.

In the optical module according to the aspect of the invention, it is preferable that the spectroscopic control unit controls the spectroscopic element to perform stepwise driving, by which the wavelength of the emitted light is sequentially changed to a plurality of wavelengths between a first wavelength and a second wavelength less than the first wavelength at a predetermined interval or less in an increasing direction or a decreasing direction.

According to the aspect of the invention with this configuration, the spectroscopic element is driven in a stepwise manner in such a manner that the wavelength is changed at the predetermined interval or less between the first wavelength and the second wavelength.

That is, the photodetection period of the first pixel block for the frame C starts when the photodetection period of the final pixel block for the valid frame A ends and then the longest drive time among drive times required for the stepwise driving elapses. In this configuration, a drive time (also referred to an initialization time) at the returning of the wavelength from an initial wavelength to a final wavelength in the stepwise driving is not set as the longest drive time. Typically, the initialization time is greater than each of the drive times for the stepwise driving. For this reason, it is possible to reduce the time required for acquiring one frame by not setting the initialization time as the longest drive time.

It is preferable that the optical module according to the aspect of the invention further includes a stabilization detection unit that detects a stabilization timing at which the amount of variation of the wavelength of the emitted light in the spectroscopic element falls into a range of predetermined threshold values; and an imaging element control unit that starts the accumulation of electric charges in a first pixel block at the stabilization timing of the spectroscopic element, at which the wavelength change driving is started along with the end of the photodetection period of the final pixel block for which the photodetection process is performed at the end for the one frame, in which the photodetection process is initially performed for the first pixel block.

According to the aspect of the invention with this configuration, when the spectroscopic element is stabilized, the accumulation of electric charges of the first pixel block starts.

In this configuration, the wavelength change driving is started along with the end of the photodetection period of the final pixel block for a valid frame. Until the stabilization of the spectroscopic element is detected, the photodetection period of a subsequent frame does not start, and when the stabilization is detected, the accumulation of electric charges of the first pixel block for the subsequent frame starts. Accordingly, it is possible to set the length of the non-photodetection period occurring for each of the pixel blocks between valid frames to a length in response to a wavelength change driving time, and invalid frames do not occur.

Accordingly, it is possible to optimize the time required for acquiring one frame, and further reduce a measurement time.

It is possible to more reliably prevent the imaging element from photodetecting light of wavelengths other than the predetermined wavelength, and it is possible to more reliably prevent a decrease in measurement accuracy.

Another aspect of the invention is directed to an electronic apparatus including: an optical module including a spectroscopic element that selects light of a predetermined wavelength from incident light, and can change the wavelength of light to be emitted as emitted light, a roll shutter-type imaging element that has pixels which accumulates electric charges when being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period, and a spectroscopic control unit that controls the wavelength change driving of the emitted light, in which the spectroscopic control unit controls the spectroscopic element to start the wavelength change driving at an end timing of the photodetection period of a final pixel block for which the photodetection process is performed at the end for the one frame; and a control unit that controls the optical module.

According to the aspect of the invention, similar to the aspect of the invention relating to the optical module, the spectroscopic element starts the wavelength change driving of the rolling shutter-type imaging element at the end timing of the photodetection period of the final pixel block for one-frame image.

Accordingly, similar to the aspect of the invention relating to the optical module, it is possible to prevent two consecutive frames from becoming invalid, and reduce a measurement time.

Similar to the aspect of the invention relating to the optical module, since the wavelength change driving is performed at the end timing of the photodetection period for a valid frame, it is possible to reduce a measurement time without providing an unnecessary time between the end of the photodetection period for the frame and the start of the wavelength change driving.

Still another aspect of the invention is directed to a method of driving an optical module including a spectroscopic element that selects light of a predetermined wavelength from incident light, and can change the wavelength of light to be emitted as emitted light, and a roll shutter-type imaging element that has pixels which accumulate electric charges when being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period, the method comprising: accumulating electric charges in the pixels with a predetermined time delay for each of the pixel blocks for the one frame; and controlling the spectroscopic element to start the wavelength change driving of the emitted light at an end timing of the photodetection period of a final pixel block for which the photodetection process is performed at the end for the one frame.

According to the aspect of the invention, similar to the aspect of the invention relating to the optical module, the spectroscopic element starts the wavelength change driving of the rolling shutter-type imaging element at the end timing of the photodetection period of the final pixel block for one-frame image.

Accordingly, similar to the aspect of the invention relating to the optical module, it is possible to prevent two consecutive frames from becoming invalid, and reduce a measurement time.

Similar to the aspect of the invention relating to the optical module, since the wavelength change driving is performed at the end timing of the photodetection period for a valid frame, it is possible to reduce a measurement time without providing an unnecessary time between the end of the photodetection period for the frame and the start of the wavelength change driving.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

First Embodiment

Figure 1:
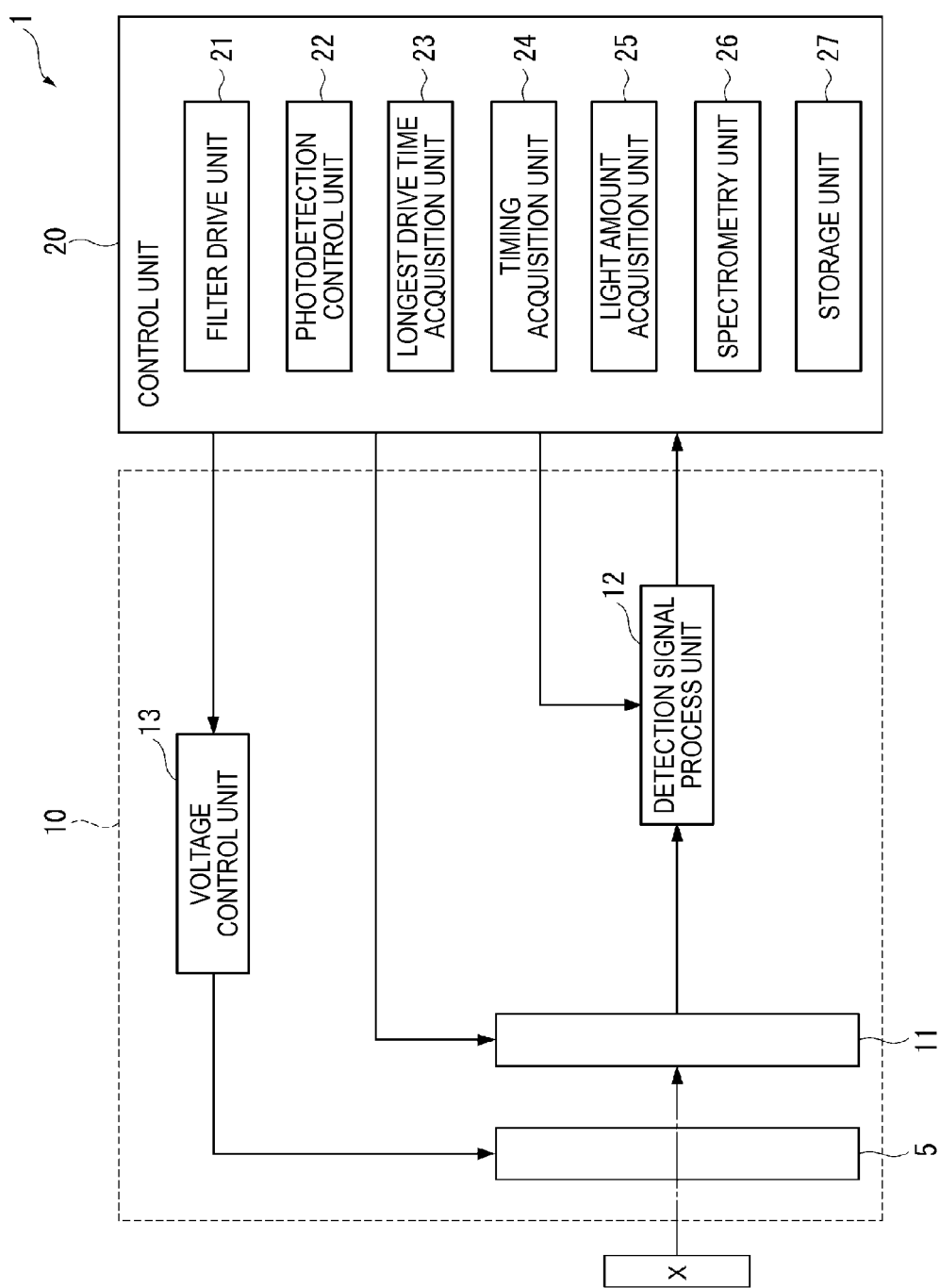
FIG. 1 is a block diagram illustrating the schematic configuration of a spectrometry apparatus according to a first embodiment.

Hereinafter, a first embodiment of the invention will be described with reference to the accompanying drawings.
Configuration of Spectrometry Apparatus FIG. 1 is a block diagram illustrating the schematic configuration of the spectrometry apparatus according to the first embodiment of the invention.

A spectrometry apparatus 1 is an electronic apparatus, and performs a spectroscopic measurement so as to acquire a predetermined wavelength of the light intensity of measurement target light reflected by a measurement target X. As illustrated in FIG. 1, the spectrometry apparatus 1 includes a spectroscopic module 10 and a control unit 20. The spectroscopic module 10 includes at least a wavelength variable interference filter 5 (a spectroscopic element); an imaging element 11; a detection signal process unit 12; and a voltage control unit 13.

In the spectrometry apparatus 1, the wavelength variable interference filter 5 is driven in response to a command signal from the control unit 20, and the wavelength variable interference filter 5 emits light of a certain wavelength in response to the command signal. In the spectrometry apparatus 1, the imaging element 11 photodetects the light emitted from the wavelength variable interference filter 5, and outputs a detection signal in response to the light intensity of the photodetected light. At this time, in the embodiment, the spectrometry apparatus 1 sets the drive timing of each of the wavelength variable interference filter 5 and the imaging element 11, and drives the wavelength variable interference filter 5 and the imaging element 11.

Figure 2:
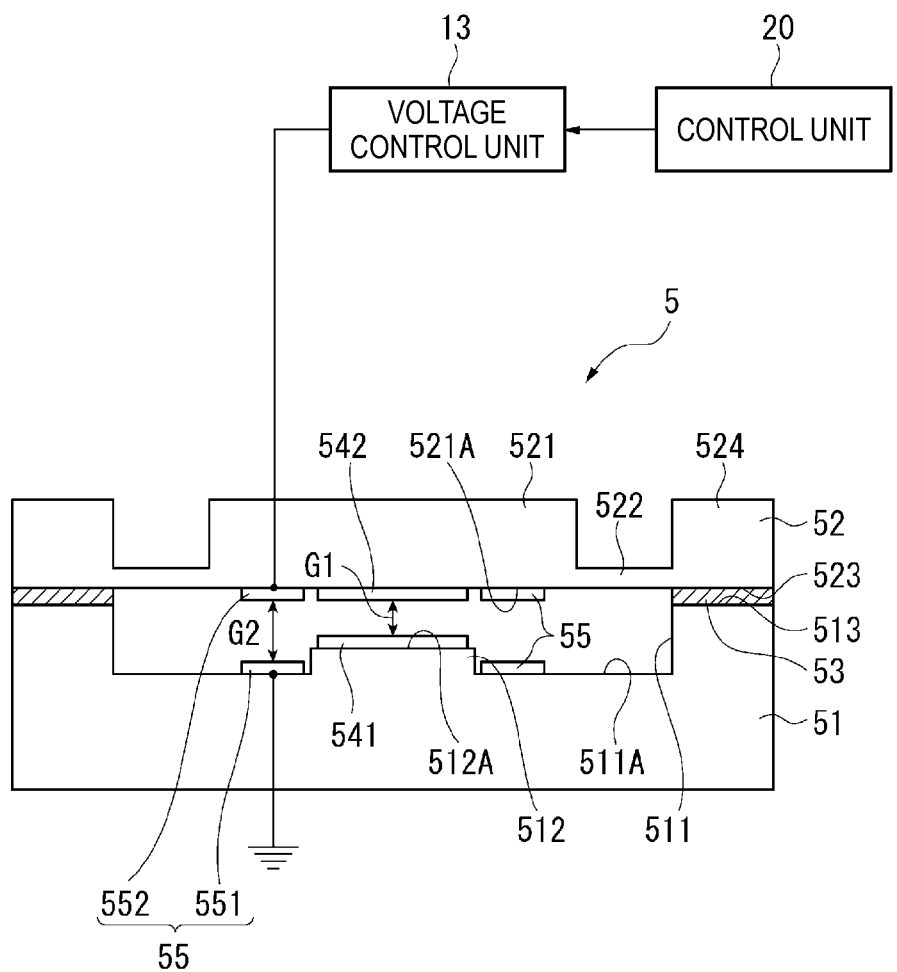
FIG. 2 is a view illustrating the schematic configuration of a wavelength variable interference filter.

In the example of the embodiment, the measurement target light reflected by the measurement target X is measured, however, when a luminous body such as a liquid crystal panel is used as the measurement target X, the measurement target light may be light emitted from the light emitting body.
Configuration of Spectroscopic Module Hereinafter, a configuration of each portion of the spectroscopic module 10 will be described.
Configuration of Wavelength Variable Interference Filter For example, the wavelength variable interference filter 5 is a rectangular plate-shaped optical member, and as illustrated in FIG. 2, the wavelength variable interference filter 5 includes a fixed substrate 51; a movable substrate 52; a pair of reflective films 541 and 542; and an electrostatic actuator 55.

The wavelength variable interference filter 5 can control the dimension of a gap G1 between the pair of the reflective films 541 and 542 via the application of a drive voltage to the electrostatic actuator 55 from the voltage control unit 13, and can extract light of a given wavelength in response to the dimension of the gap G1 as interference light.

In the wavelength variable interference filter 5, the fixed substrate 51 and the movable substrate 52 can be made of various types of glass materials, liquid crystal, or the like. A first bonding portion 513 of the fixed substrate 51 and a second bonding portion 523 of the movable substrate 52 are integrally formed by bonding the first bonding portion 513 and the second bonding portion 523 using a bonding film 53 that is formed by a plasma polymerized film having siloxane or the like as a main constituent, for example.

The fixed substrate 51 is provided with the fixed reflective film 541, and the movable substrate 52 is provided with the movable reflective film 542. The fixed reflective film 541 and the movable reflective film 542 are disposed to face each other with the gap G1 interposed therebetween. The size of the gap G1 between the reflective films is equal to the distance between the surface of the fixed reflective film 541 and the surface of the movable reflective film 542.
Configuration of Fixed Substrate As illustrated in FIG. 2, the fixed substrate 51 includes an electrode disposition groove 511 formed by etching or the like, and a reflective film mounting portion 512.

The electrode disposition groove 511 is provided in the fixed substrate 51, but not in an outer circumferential portion of the fixed substrate 51 in a plan view of the filter. A groove bottom surface of the electrode disposition groove 511 becomes an electrode mounting surface 511A on which an electrode of the electrostatic actuator 55 is disposed.

The electrode mounting surface 511A is provided with a fixed electrode 551 of the electrostatic actuator 55. The fixed electrode 551 is provided on an outer circumference of the reflective film mounting portion 512.

The fixed substrate 51 is provided with an electrode lead-out groove (not illustrated in FIG. 2) that is continuous from the electrode disposition groove 511 toward an outer circumferential portion of the substrate. The fixed electrode 551 includes a connection electrode that is provided in the electrode disposition groove 511 and the electrode lead-out groove and is exposed from the substrate outer circumferential portion to the outside. An exposed portion of the connection electrode is grounded.

The reflective film mounting portion 512 is formed to protrude from a center portion of the electrode disposition groove 511 toward the movable substrate 52. A protruding distal end surface of the reflective film mounting portion 512 becomes a reflective film mounting surface 512A, and the fixed reflective film 541 is mounted on the protruding distal end surface thereof.

The fixed reflective film 541 can be a metal film made of Ag or the like, or a conductive alloy film made of an Ag alloy or the like. For example, the fixed reflective film 541 may be a dielectric multilayer film having a high refractive $TiO_2$ layer and a low refractive $SiO_2$ layer, and in this case, a conductive metal alloy film is preferably formed on the lowermost layer or the surface layer of the dielectric multilayer film.

A reflection preventive film may be formed on a light incident surface (surface that is not provided with the fixed reflective film 541) of the fixed substrate 51, and may be positioned to correspond to the fixed reflective film 541. The reflection preventive film can be formed by alternately laminating the low refractive films and the high refractive films, thereby the reflection preventive film decreases the reflectivity of visible light on the surface of the fixed substrate 51, and increases the transmittance of the visible light.

The electrode disposition groove 511 and the reflective film mounting portion 512 are not formed on a part of the surface of the fixed substrate 51, which faces the movable substrate 52, and the first bonding portion 513 is formed by the part of the surface of the fixed substrate 51. The first bonding portion 513 is bonded to the second bonding portion 523 of the movable substrate 52 via the bonding film 53.

Configuration of Movable Substrate

The movable substrate 52 includes a movable portion 521 of a circular shape or the like which is provided at a center portion of the movable substrate 52; a holding portion 522 that supports the movable portion 521; and a substrate outer circumferential portion 524 that is provided outward of the holding portion 522.

The movable portion 521 has a thickness dimension greater than that of the holding portion 522, and for example, in the embodiment, the movable portion 521 has the same thickness dimension as that of the movable substrate 52. A movable surface 521A of the movable portion 521 faces the fixed substrate 51, and is provided with the movable reflective film 542 and a movable electrode 552.

Similarly to the fixed substrate 51, a reflection preventive film may be formed on a surface of the movable portion 521, which is opposite to the fixed substrate 51.

The movable reflective film 542 is provided in a center portion of the movable surface 521A of the movable portion 521 so as to face the fixed reflective film 541 with the gap G1 interposed between the reflective films. The movable reflective film 542 may be a reflective film with the same configuration as that of the fixed reflective film 541.

The movable surface 521A is provided with the movable electrode 552 of the electrostatic actuator 55. The movable electrode 552 is provided on an outer circumference of the movable reflective film 542.

The movable electrode 552 is disposed to face the fixed electrode 551 with a gap G2 interposed between the electrodes in a plan view seen in a direction of the thickness of the substrate.

The electrostatic actuator 55 includes the fixed electrode 551. The detailed description of the electrostatic actuator 55 will be given later.

The movable electrode 552 includes a connection electrode (not illustrated in FIG. 2) which is disposed from a part of an outer circumferential edge of the movable electrode 552 along a position facing the fixed electrode lead-out groove formed in the fixed substrate 51, and which is exposed from a substrate outer circumferential portion to the outside. An exposed portion of the connection electrode is connected to the voltage control unit 13 via flexible printed circuits (FPC), a lead wire, or the like.

The holding portion 522 is a diaphragm that surrounds the circumference of the movable portion 521, and the holding portion 522 has a thickness dimension less than that of the movable portion 521. The holding portion 522 is bent (flexes) easier than the movable portion 521, and when a small attractive electrostatic force is applied thereto, the movable portion 521 can be displaced toward the fixed substrate 51. In the example of the embodiment, the holding portion 522 has a diaphragm shape, however, the shape of the holding portion 522 is not limited to that shape. For example, beam-shaped holding portions may be provided while being disposed at equiangular intervals about a center point O of the filter.

As described above, the substrate outer circumferential portion 524 is provided outward of the holding portion 522 in the plan view of the filter. A surface of the substrate outer circumferential portion 524, which faces the fixed substrate 51, is provided with the second bonding portion 523 that faces the first bonding portion 513. The second bonding portion 523 is bonded to the first bonding portion 513 via the bonding film 53.

Configuration of Imaging Element, Detection Signal Process Unit, and Voltage Control Unit With reference to FIG. 1, the imaging element 11, the detection signal process unit 12, and the voltage control unit 13 of the spectroscopic module 10 will be described.

The imaging element 11 has a plurality of pixels that are arranged in a two-dimensional planar array. The imaging element 11 performs a photodetection process including a photodetection period and a non-photodetection period. In the photodetection period, the imaging element 11 accumulates electric charges for each of the plurality of pixels in response to the amount of light exposure, and in the non-photodetection period, the imaging element 11 outputs a detection signal in response to the accumulated electric charges via the transmission of the accumulated electric charges. The output detection signal is input to the detection signal process unit 12. The imaging element 11 is one of various image sensors such as a CMOS and a CCD.

Here, in the embodiment, the imaging element 11 has a plurality of pixel rows (for example, a plurality of pixel rows have n rows of Line 1 to Line n, and each of the pixel rows is equivalent to a pixel block according to the invention) arranged in one direction. The imaging element 11 preferably uses a rolling shutter method. That is, the imaging element 11 performs the photodetection process for each of the pixel rows for a predetermined time with a predetermined time delay for each of the pixel rows, in which the imaging element 11 accumulates electric charges in response to the amount of light exposure for only a predetermined photodetection time, transmits the accumulated electric charges (that is, outputs a detection signal), and resets the accumulated electric charges. That is, the imaging element 11 performs the photodetection process for one frame, which includes the photodetection period corresponding to the photodetection time and the non-photodetection period for resetting electric charges, while delaying the photodetection process for each of a first pixel row (Line 1) to a final pixel row (Line n) for the predetermined time.

A predetermined time (hereinafter, also referred to as an electric charge transmission time) is required to transmit accumulated charges in the non-photodetection period. For example, the electric charge transmission time is a time on the order of μ, seconds, and is negligibly small compared to the photodetection period (to be described later) or a drive time of the wavelength variable interference filter 5.

The detection signal process unit 12 amplifies the input detection signal (analog signal), then converts the input analog signal into a digital signal, and outputs the digital signal to the control unit 20. The detection signal process unit 12 includes an amplifier for amplifying a detection signal, an A/D converter for converting an analog signal into a digital signal, and the like.

The voltage control unit 13 applies a drive voltage to the electrostatic actuator 55 of the wavelength variable interference filter 5 based on a control operation of the control unit 20. Accordingly, an attractive electrostatic force occurs between the fixed electrode 551 and the movable electrode 552 of the electrostatic actuator 55, and the movable portion 521 is displaced toward the fixed substrate 51.

Configuration of Control Unit

Subsequently, the control unit 20 will be described.

The control unit 20 is configured by assembling a CPU, a memory, and the like, and controls the operation of the spectrometry apparatus 1. As illustrated in FIG. 1, the control unit 20 includes a filter drive unit 21; a photodetection control unit 22; a longest drive time acquisition unit 23; a timing acquisition unit 24; a light amount acquisition unit 25; a spectrometry unit 26; and a storage unit 27. The storage unit 27 stores V-λ data illustrating a relationship between the wavelength of light transmitting through the wavelength variable interference filter 5 and a drive voltage that is applied to the electrostatic actuator 55 corresponding to the wavelength.

The photodetection control unit 22, the longest drive time acquisition unit 23, and the timing acquisition unit 24 are an imaging element control unit. The voltage control unit 13 and the filter drive unit 21 are a spectroscopic control unit. That is, the wavelength variable interference filter 5, the imaging element 11, the voltage control unit 13, the filter drive unit 21, the photodetection control unit 22, the longest drive time acquisition unit 23, and the timing acquisition unit 24 make up the optical module.

The filter drive unit 21 sets the target wavelength of light extracted by the wavelength variable interference filter 5, and outputs a command signal to the voltage control unit 13, as per which a drive voltage corresponding to the set target wavelength is applied to the electrostatic actuator 55 based on the V-λ data.

The filter drive unit 21 starts the drive of the wavelength variable interference filter 5 in accordance with the end timing of the photodetection period of the final pixel row (Line n) among the plurality of pixel rows for a valid frame when the imaging element 11 is continuously driven, which will be described later (refer to FIG. 3).

The photodetection control unit 22 performs the photodetection process in which the imaging element 11 accumulates electric charges for only the predetermined photodetection time in response to the amount of exposure to measurement light, and the imaging element 11 outputs a detection signal based on the amount of light exposure. The photodetection control unit 22 controls the imaging element 11 to accumulate electric charges for only a pre-set photodetection time. After the predetermined photodetection time elapses, the photodetection control unit 22 controls the imaging element 11 to transmit the accumulated electric charges (transmission of electric charges) for a predetermined non-photodetection time during which electric charges are not accumulated.

Figure 3:
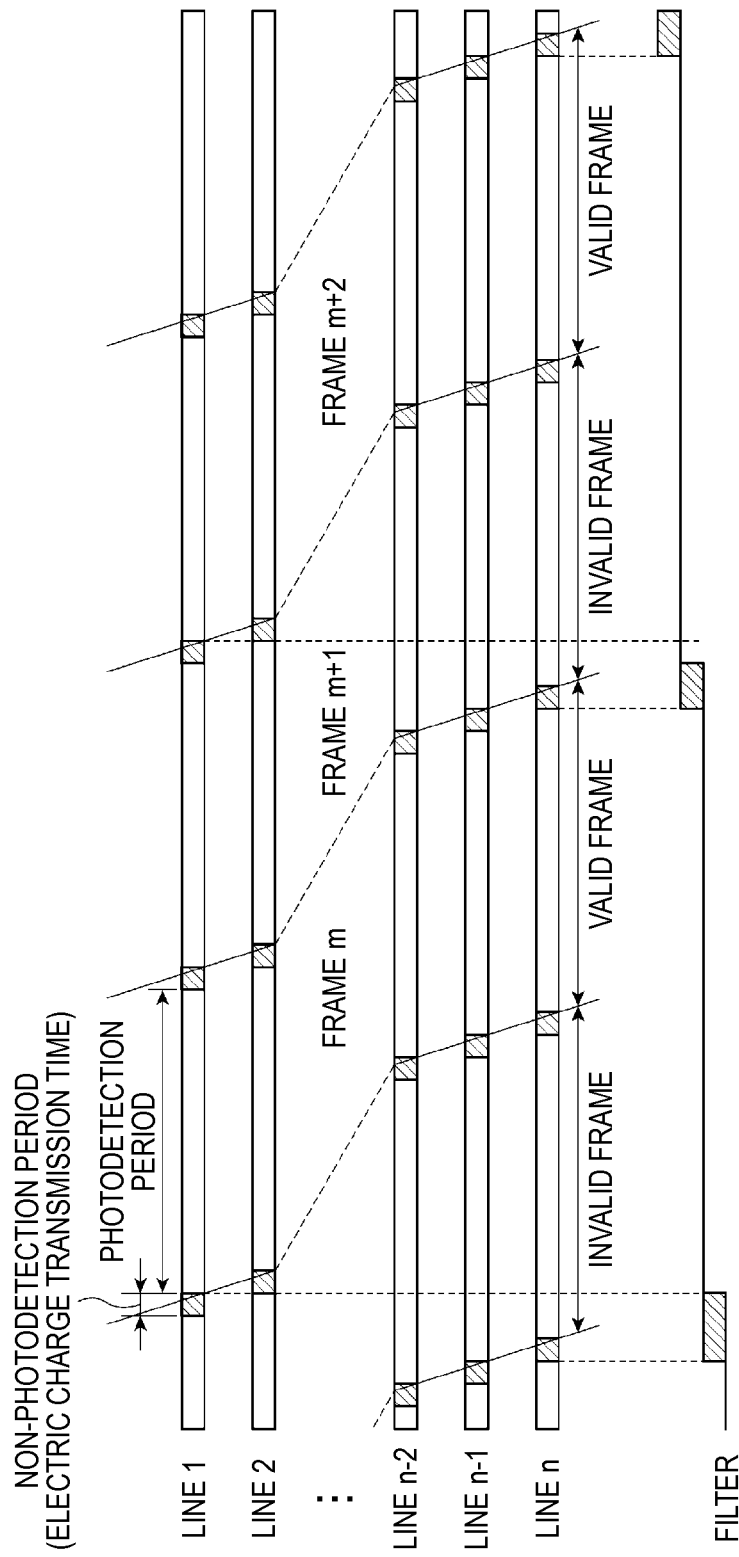
FIG. 3 is a chart illustrating the drive timing of the wavelength variable interference filter and an imaging element.

Here, in the embodiment, FIG. 3 is a chart illustrating a drive timing relationship between the wavelength variable interference filter 5 and the imaging element 11.

As illustrated in FIG. 3, the photodetection control unit 22 performs the photodetection process for one frame, which includes the photodetection period (corresponding to the photodetection time) and the non-photodetection period (corresponding to the non-photodetection time and including the electric charge transmission time), while delaying the photodetection process for each of the pixel rows (Line 1 to Line n) of the imaging element 11 for the predetermined time. The photodetection control unit 22 controls the imaging element 11 in such a manner that the photodetection time and the non-photodetection period are alternated for each of the pixel rows (Line 1 to Line n).

The predetermined time obtained by adding up the photodetection time and the non-photodetection period is the time required (desired) for detecting the amount of light exposure corresponding to one frame for each of the pixel rows, and hereinafter, is also referred to as a required frame time.

When the wavelength variable interference filter 5 and the imaging element 11 are continuously capturing images while being synchronized with each other, the longest drive time acquisition unit 23 acquires the longest drive time required for driving the wavelength variable interference filter 5 based on a pre-set measurement pattern.

In the spectrometry apparatus 1, when a spectroscopic measurement is performed, a plurality of measurement target wavelengths and the measurement sequence of the measurement target wavelengths are pre-set as the measurement pattern. The filter drive unit 21 outputs command signals for the measurement target wavelengths to the voltage control unit 13 in sequence, and changes a gap dimension of the wavelength variable interference filter 5 in sequence so that the plurality of measurement target wavelengths are measured based on the measurement pattern.

Here, the drive time required for changing the gap dimension of the wavelength variable interference filter 5 changes in response to the amount of gap variation, a method of varying the gap, or the like. For example, when the amount of gap variation increases, the drive time increases, and in contrast, when the amount of gap variation decreases, the drive time decreases. In addition, for example, the drive time increases when the gap dimension decreases rather than when the gap dimension increases.

For example, in a case where the photodetection process is performed in a stepwise driving mode while changing the gap dimension in order for the gap to be gradually narrowed or widened, or in a case where the gap dimension returns from a gap dimension corresponding to the final wavelength to a gap dimension corresponding to the initial wavelength, the drive time in the latter case becomes longer than that in the former case.

When starting a measurement, a user defines the measurement pattern indicative of measurement target wavelengths and the measurement sequence. Specifically, the spectrometry apparatus 1 may be configured in such a manner that the user can select the measurement pattern from a plurality of measurement patterns which are pre-stored in the storage unit 27, or the user can set the measurement pattern by operating an operation unit (not illustrated).

In a case where the measurement pattern can be selected, the storage unit 27 pre-stores the longest drive times in response to the measurement patterns, and the longest drive time acquisition unit 23 acquires the longest drive time in response to the measurement pattern.

The storage unit 27 pre-stores data indicative of a relationship between the amount of variation of the gap dimension and the drive time, and the like, and the longest drive time acquisition unit 23 acquires the longest drive time using the data and the like.

The timing acquisition unit 24 sets the photodetection period and the non-photodetection period for each of the pixel rows based on the longest drive time acquired by the longest drive time acquisition unit 23.

Here, when the amount of light exposure of each of the pixel rows for a frame is acquired in a state in which the gap dimension of the wavelength variable interference filter 5 is stabilized at a set value, the frame is referred to as a valid frame. In contrast, when the amount of light exposure of each of pixel rows for a frame is acquired in a state in which the gap dimension of the wavelength variable interference filter 5 is varied, the frame is referred to as an invalid frame.

As described above, the timing acquisition unit 24 acquires and sets the drive timing of the imaging element 11 in such a manner that an end timing of the non-photodetection period of the first pixel row Line 1 for an invalid frame subsequent to a valid frame is a timing from when the photodetection period of the final pixel row Line n for the valid frame ends to when the longest drive time elapses. Here, the timing acquisition unit 24 acquires the photodetection time and the non-photodetection time of the imaging element 11 in such a manner that the wavelength variable interference filter 5 and the imaging element 11 are driven at the above-described timing.

In the embodiment, as described in FIG. 3, the drive of the wavelength variable interference filter 5 is started in accordance with the end timing of the photodetection period of the final pixel row (Line n) for a valid frame (for example, frame m in FIG. 3, and equivalent to a first frame according to the invention) when the imaging element 11 is continuously driven. The wavelength changing drive ends before the end of the non-photodetection period of the first pixel row (Line 1) for an invalid frame (for example, frame m+1 in FIG. 3, and equivalent to a second frame according to the invention) subsequent to the valid frame (before the start of the photodetection period of a valid frame subsequent to the invalid frame starts). As such, the wavelength changing drive ends before the start of the photodetection period of the first pixel row (Line 1) for a frame subsequent to an invalid frame, and the frame subsequent to the invalid frame becomes a valid frame.

As described above, the timing acquisition unit 24 may set the drive timing of the imaging element 11 in such a manner that the end timing of the first pixel row (Line 1) for an invalid frame subsequent to a valid frame is greater than that from when the photodetection period of the final pixel row (Line n) for the valid frame ends to when the longest drive time elapses. At this time, the timings are preferably set in such a manner that the end timing of the first pixel row (Line 1) for the invalid frame subsequent to the valid frame is a timing from when the longest drive time elapses to when a predetermined time elapses. The invention includes such a case. The predetermined range is preferably greater than the allowable tolerance of a drive time estimated in response to the specification of the wavelength variable interference filter 5, the measurement pattern, and the like. Accordingly, it is possible to more reliably start the photodetection period of the first pixel row (Line 1) for a valid frame (for example, the frame m and a frame m+2 in FIG. 3) subsequent to the invalid frame in a state in which the wavelength variable interference filter 5 is stabilized.

The light amount acquisition unit 25 acquires a detection signal for each pixel row output from the imaging element 11 via the detection signal process unit 12. The light amount acquisition unit 25 acquires the amount of light of a measurement wavelength, which transmits through the wavelength variable interference filter 5, based on the acquired signal.

The spectrometry unit 26 measures the spectral characteristics of the measurement target light based on the amount of light acquired by the light amount acquisition unit 25.

Operation of Spectrometry Apparatus

Subsequently, the operation of the spectrometry apparatus 1 will be described with reference to the drawings.

Figure 4:
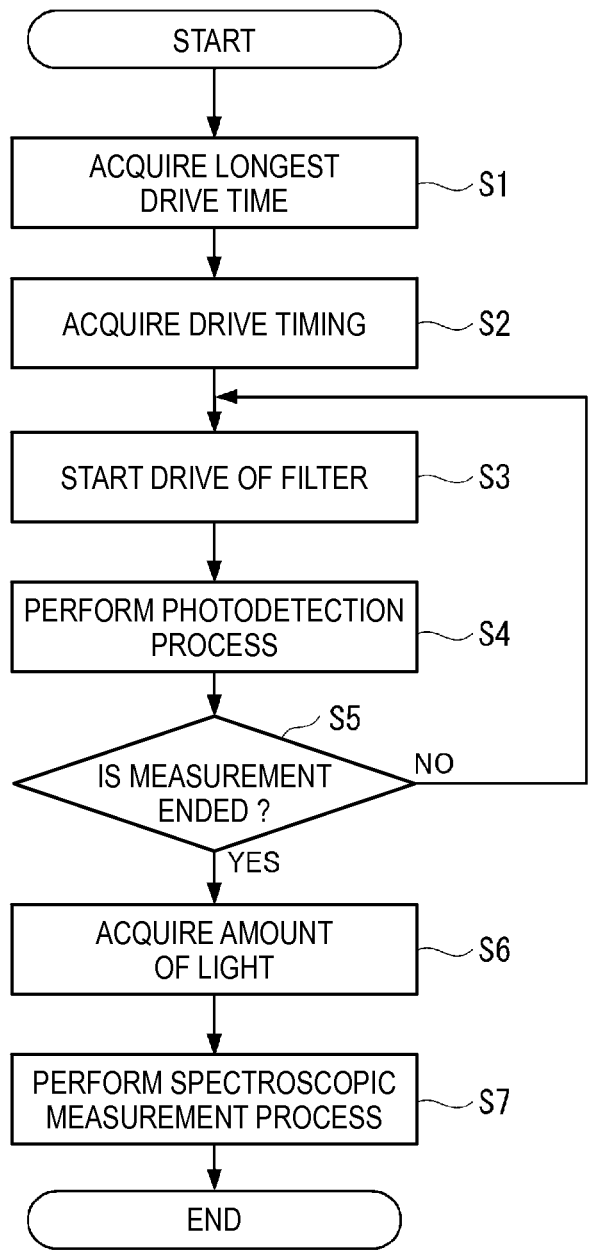
FIG. 4 is a flowchart illustrating an example of a spectrometry process of the spectrometry apparatus.

FIG. 4 is a flowchart illustrating an example of the operation of a spectrometry system.

First, a user operates the spectrometry apparatus 1, and sets a measurement pattern.

When the measurement pattern is set, the longest drive time acquisition unit 23 acquires the longest drive time based on the set measurement pattern (step S1).

Subsequently, the timing acquisition unit 24 acquires the drive timing of each of the wavelength variable interference filter 5 and the imaging element 11 based on the longest drive time acquired by the longest drive time acquisition unit 23 (step S2).

The timing acquisition unit 24 acquires the photodetection period and the non-photodetection period of the imaging element 11 in such a manner that the end timing of the first pixel row (Line 1) for an invalid frame subsequent to a valid frame is a timing from when the photodetection period of the final pixel row (Line n) for the valid frame ends to when the longest drive time elapses (refer to FIG. 3). The timing acquisition unit 24 sets the photodetection period and the non-photodetection period (drive pattern) of each of the pixel rows for the timing of starting the drive of the imaging element 11 when the imaging element 11 is continuously driven.

Subsequently, the drive of the wavelength variable interference filter 5 and the imaging element 11 is started (step S3). That is, the filter drive unit 21 outputs a command signal to the voltage control unit 13, as per which a drive voltage corresponding to a target wavelength is applied to the electrostatic actuator 55 based on the measurement pattern, and starts the drive of the wavelength variable interference filter 5. Here, a drive voltage corresponding to an initial measurement wavelength is applied to the electrostatic actuator 55. In the spectrometry apparatus 1, accumulated electric charges are reset immediately after the drive is started.

Subsequently, the photodetection control unit 22 controls the imaging element 11 to perform the photodetection process based the drive pattern set by the timing acquisition unit 24 (step S4).

The photodetection control unit 22 controls the imaging element 11 in such a manner that the photodetection process is performed after a predetermined time is delayed for each of the pixel rows (Line 1 to Line n). The wavelength change driving of the wavelength variable interference filter 5 ends when the photodetection process for the valid frame starts (refer to FIG. 3), and the wavelength variable interference filter 5 is set to a gap dimension corresponding to a target wavelength.

The photodetection control unit 22 controls the imaging element 11 to perform the electric charge transmission process for each of the pixel rows (Line 1 to Line n) in the non-photodetection period subsequent to the photodetection period.

Subsequently, the filter drive unit 21 determines whether to end the measurement (step S5). The filter drive unit 21 determines whether it is necessary to change the measurement wavelength to a subsequent measurement wavelength, that is, whether the current measurement is a measurement end before the valid frame ends.

For example, the measurement end is determined by whether the measurements of the entirety of the measurement wavelengths are ended, based on the set measurement pattern. The measurement end may be determined when an instruction of the measurement end is received via an operation by a user.

When the current measurement is determined not to be the measurement end in step S5, the process returns to step S3, and the filter drive unit 21 starts the drive of the wavelength variable interference filter 5 at the end timing of the photodetection period of the final pixel row (Line n) for the valid frame.

The photodetection control unit 22 controls the imaging element 11 to perform the electric charge transmission process of the final pixel row (Line n).

In contrast, when the current measurement is determined to be the measurement end in step S5, the photodetection control unit 22 controls the imaging element 11 to perform the electric charge transmission process of the final pixel row (Line n) at the end timing of the photodetection period of the final pixel row (Line n) for the valid frame. The filter drive unit 21 ends the drive of the wavelength variable interference filter 5. In addition, the photodetection control unit 22 ends the drive of the imaging element 11.

While step S3 to step S5 are repeated, the imaging element 11 sequentially outputs a detection signal corresponding to each of the pixel rows (Line 1 to Line n) for each frame. The light amount acquisition unit 25 acquires the detection signal output from the imaging element 11 via the detection signal process unit 12. The light amount acquisition unit 25 stores the detection signal corresponding to the valid frame in the storage unit 27 as a detection signal indicative of the amount of light exposure, based on the set drive pattern.

Subsequently, the light amount acquisition unit 25 acquires the amount of light of the measurement wavelength, which transmits through the wavelength variable interference filter 5, based on the acquired detection signal for the valid frame (step S6).

The spectrometry unit 26 measures the spectral characteristics of the measurement target light based on the amount of light acquired by the light amount acquisition unit 25 (step S7).

As such, the spectrometry apparatus 1 acquires the spectral characteristics of the measurement target X based on the set measurement pattern.

FIG. 4 illustrates an example in which a measurement is performed based on a measurement pattern, a detection signal corresponding to the amount of light exposure for a valid frame is acquired, and the amount of light is acquired after the end of the measurement. For example, the spectrometry apparatus 1 may acquire the amount of light every time when the detection signal corresponding to the valid frame is acquired.

Effects of First Embodiment

In the spectrometry apparatus 1, the imaging element 11 includes the plurality of pixel rows (Line 1 to Line n), is the rolling shutter type, and sequentially outputs a detection signal for each of the pixel rows, which is in response to electric charges accumulated according to the amount of light exposure. When the photodetection period of the final pixel row (Line n) for a valid frame ends, the wavelength change driving of the wavelength variable interference filter 5 is started.

Accordingly, in the spectrometry apparatus 1, it is possible to prevent two or more invalid frames from occurring in succession.

Figure 5:
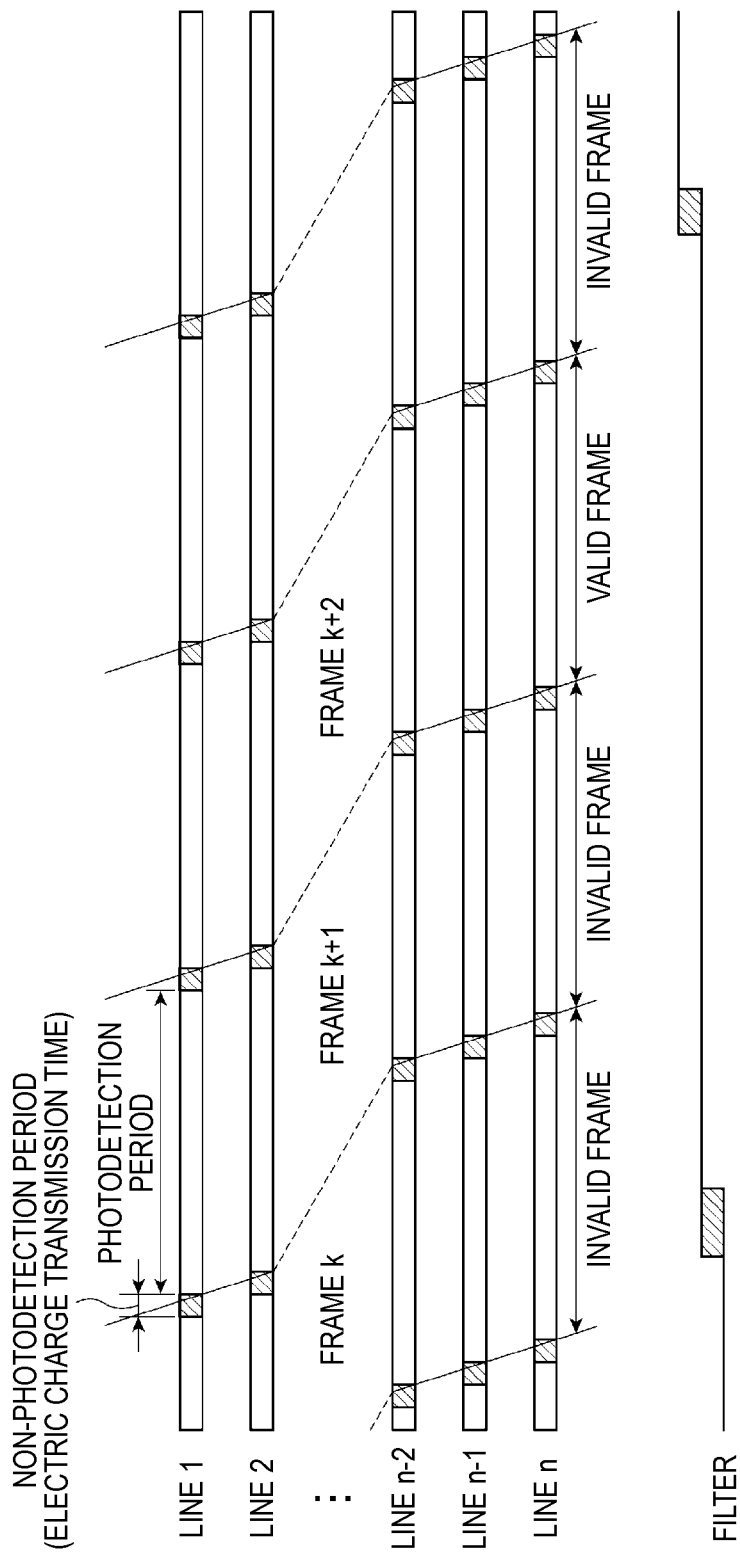
FIG. 5 is a chart illustrating the drive timing of the wavelength variable interference filter and the imaging element in a comparative example.

Here, FIG. 5 is a chart illustrating an example of the drive timing of the wavelength variable interference filter 5 and the imaging element 11 in a case where the wavelength change driving of the wavelength variable interference filter 5 is started when the photodetection period of the final pixel row of the imaging element 11 for a valid frame does not end. In this case, there is a problem in that it is not possible to appropriately detect the amount of light exposure for two consecutive frames.

That is, as illustrated in FIG. 5, when the wavelength change driving is started during a period in which the photodetection processes for two frame k and frame k+1 are concurrently performed, the two frame k and frame k+1 become invalid frames.

In contrast, in the embodiment, since the wavelength change driving of the wavelength variable interference filter 5 is performed when the photodetection period of the final pixel row (Line n) for the frame m ends, it is possible to reduce a time from the end of the photodetection period of the final pixel row (Line n) for the frame m to the end of the wavelength change driving. For this reason, the photodetection period of the first pixel row (Line 1) of the frame m+2 starts before the end of the wavelength change driving, and it is possible to prevent from the frame m+2 from becoming an invalid frame. That is, it is possible to prevent from two consecutive frame m+1 and frame m+2 from becoming invalid.

Since the wavelength change driving is performed at the end timing of the photodetection period for a valid frame, it is possible to reduce a measurement time without providing an unnecessary time between the end of the photodetection period and the start of the wavelength change driving.

More specifically, in the spectrometry apparatus 1, as described above, a time from the end of the photodetection period of the final pixel row (Line n) for the valid frame m to the end of the non-photodetection period of the first pixel row Line 1 for the subsequent frame m+1 is set to the longest drive time of the wavelength change driving or greater.

Accordingly, it is possible to end the wavelength change driving until the non-photodetection period of the first pixel row (Line 1) for the frame m+1 ends. Accordingly, it is possible to make the frame m and the frame m+2 become valid, with the invalid frame m+1 interposed therebetween.

As described above, it is possible to more reliably reduce a measurement time while preventing two or more consecutive frames from becoming invalid.

The spectrometry apparatus 1 sets the drive timing of the wavelength variable interference filter 5 and the imaging element 11 based on the longest drive time.

Accordingly, even when the set wavelength of the wavelength variable interference filter 5 is changed to any wavelength, it is possible to drive the wavelength variable interference filter 5 and the imaging element 11 in such a manner that a valid frame and an invalid frame occur alternately. For this reason, it is possible to more reliably prevent a decrease in measurement accuracy without performing the wavelength change driving during the photodetection period for the valid frame.

When the drive start timings of the wavelength variable interference filter 5 and the imaging element 11 are pre-synchronized, it is possible to alternately generating the valid frame and the invalid frame merely by individually driving the wavelength variable interference filter 5 and the imaging element 11 based on the drive pattern. Accordingly, it is possible to easily synchronize the drive timing of the wavelength variable interference filter 5 and the imaging element 11. In addition, since the control unit 20 can easily determine the valid frame, it is possible to prevent an increase in the process load of the control unit 20.

Modification Example of First Embodiment

In the configuration of the first embodiment, the drive pattern is set based on the longest drive time among the entirety of drive times available in the drive pattern. In contrast, in a modification example, the longest drive time is acquired from the drive times for driving the gap in a stepwise manner when the gap dimension (selected wavelength) of the wavelength variable interference filter 5 is increased or decreased repeatedly and sequentially in a stepwise driving mode.

Figure 6:
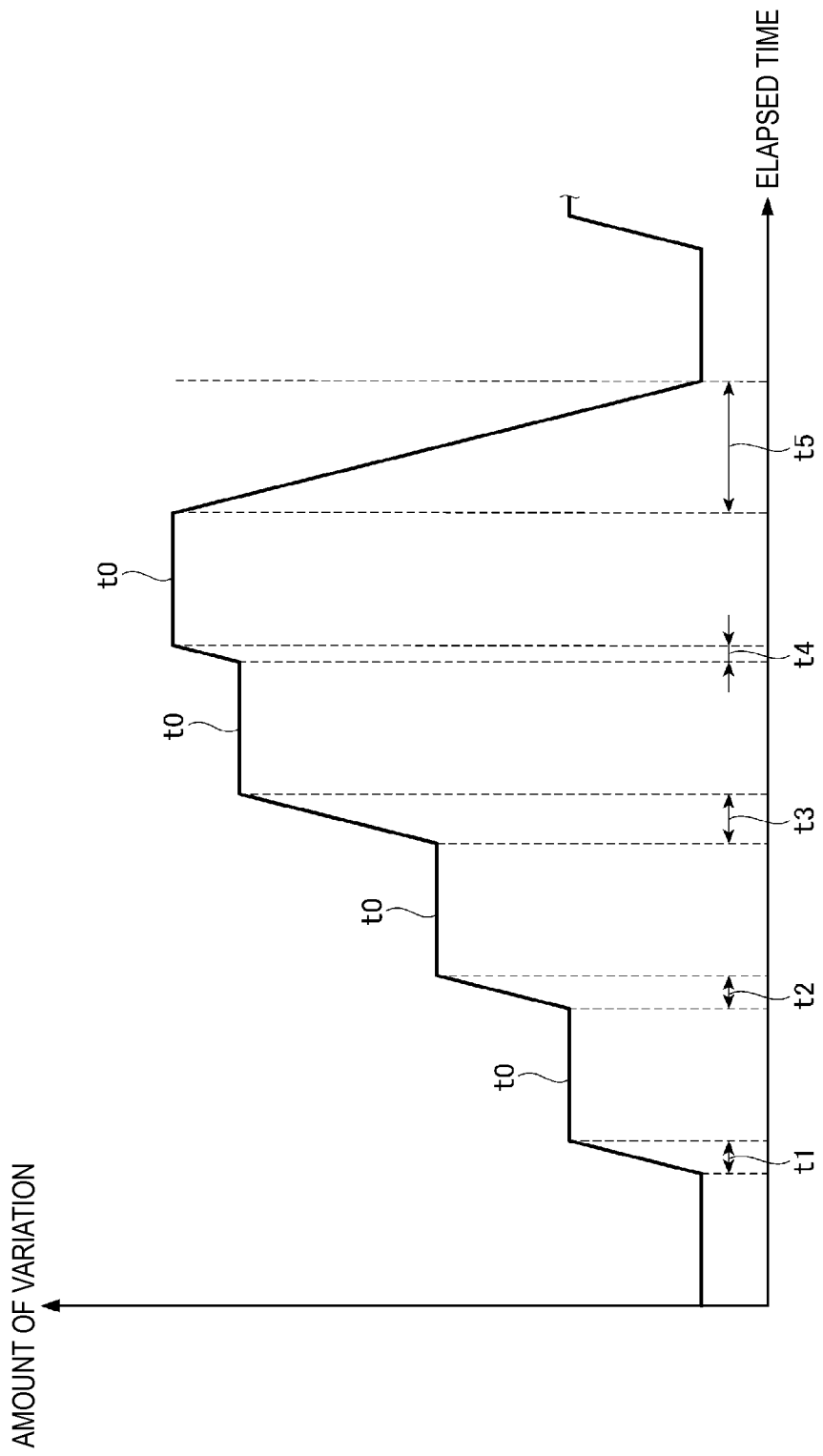
FIG. 6 is a graph illustrating an example of a drive pattern of the wavelength variable interference filter.

FIG. 6 is a graph schematically illustrating a time and the amount of variation in a case where the gap dimension is changed in a stepwise manner (hereinafter, also referred to as stepwise driving) in an increasing direction or a decreasing direction when the gap dimension of the wavelength variable interference filter 5 is set to a plurality of values, and measurements are performed for the values of the gap dimension. FIG. 6 illustrates an example when measurements are performed with the gap dimension set to five different values. The drive time and the amount of variation have a non-linear relationship, however, in FIG. 6, the drive time and the amount of variation have a linear relationship for convenience of description. In FIG. 6, a blank time secured in an actual measurement is omitted, and the photodetection time is set to t0 for a portion in which the gap dimension does not vary.

In a measurement pattern illustrated in FIG. 6, measurements are performed for the five gap dimensions while gradually increasing the amount of variation of an initial gap. In FIG. 6, the drive times for driving the gap four times refer to t1 to t4 in a driving sequence, respectively.

In the example illustrated in FIG. 6, the amount of variation for a third drive among driving the gap four times is the maximum, and the drive time t3 between the drive times t1 to t4 becomes the maximum. When the gap dimension returns from a final gap dimension (the amount of variation is the maximum, and also referred to as a final gap) of the stepwise driving to an initial gap dimension (the amount of variation is the minimum, and also referred to as a first gap), the amount of variation for driving the gap four times is changed all at once. For this reason, the drive time t5 at the returning of the gap dimension from the final gap to the first gap becomes greater than a drive time of t1 to t4.

When a measurement pattern is set to perform the stepwise driving, the longest drive time acquisition unit 23 does not include a drive time at the returning of the gap dimension from the final gap to the first gap in determining the longest drive time, and acquires the longest drive time from the drive times for the stepwise driving.

Specifically, in the embodiment, the drive time t3 is determined to be the longest drive time, which is the longest drive between the drive times t1 to t4 for driving the gap four times. At this time, the drive time t5 at the returning of the gap dimension from the final gap to the first gap is not included in determining the longest drive time.

Here, typically, an initialization time is greater than each of the drive times for the stepwise driving. For this reason, when the initialization time is not set as the longest drive time, it is possible to reduce the time required for one frame.

For example, it is possible to reduce the required frame time by reducing the longest drive time when the photodetection period can be set to be short. For example, it is possible to further reduce the frame required time by setting the non-photodetection period to the electric charge transmission time.

In the example illustrated in FIG. 6, when the stepwise driving is performed, the spectrometry apparatus 1 does not include the drive time t5 at the returning of the gap dimension from the final gap to the first gap, and includes only the drive times t1 to t4 for the stepwise driving in determining the longest drive time, and the longest drive time is set to t3. When the gap dimension returns from the final gap to the first gap, the wavelength change driving for the drive time t5 is performed over two frames, and two invalid frames become in succession.

Here, in the example illustrated in FIG. 6, when the longest drive time is set to t3, it is possible to reduce a measurement time by only a time (t5–t3) for each stepwise driving, and a required time by only a time (t5–t3)×4 for driving the gap four times in a stepwise manner, compared to when the longest drive time is set to t5. When the time (t5–t3)×4 reduced for driving the gap four times in a stepwise manner is greater than the required frame time, the time required for five measurements becomes less than when the longest drive time is set to t5. That is, when the time (t5–t3)×4 is greater than the required frame time, even though two invalid frames are in succession when the gap dimension returns from the final gap to the first gap, it is possible to reduce a measurement time compared to when a measurement is performed by setting the longest drive time to t5 and continuously performing the stepwise driving.

When a value (tr–tk)×N is greater than a required frame time at the setting of a drive time tk to the longest drive time, the longest drive time may be set to tk, and in contrast, when the value (tr–tk)×N is less than the required frame time at the setting of a drive time tk to the longest drive time, the longest drive time may be set to tr. Here, tk is the longest drive time tk for the stepwise driving, tr is the drive time for driving the gap to return from the final gap to the first gap, and N is the number of step driving.

The longest drive time acquisition unit 23 may set the end timing of the first pixel row (Line 1) for an invalid frame to a timing from when the photodetection period of the final pixel row Line n for a valid frame ends to when the longest drive time among the drive times for the wavelength change driving, in which the amount of changing the wavelength is a predetermined amount or less, elapses. That is, when a wavelength is changed in a plurality of wavelengths, the longest drive time acquisition unit 23 may be configured to acquire the longest drive time not from drive times when the amount of changing the wavelength exceeds the predetermined amount, but from drive times within a predetermined time, which correspond to a predetermined amount of changing the wavelength or less. At this time, it is possible to not set the drive time exceeding the predetermined time to the longest drive time, and it is possible to reduce the time required for one frame.

Here, for example, the predetermined amount of changing the wavelength is a maximum value of the amount of change when the wavelength is changed from an initial wavelength to a final wavelength, in a case where measurements are performed in succession for the plurality of wavelengths in patterns other than the above-described stepwise driving. The maximum value for the amount of change may be acquired from a drive pattern in a current measurement, or may be set for the entirety of pre-set drive patterns.

Second Embodiment

Hereinafter, a second embodiment of the invention will be described with reference to the accompanying drawings.

In the first embodiment, the spectrometry apparatus 1 sets a drive pattern based on the longest drive time, and drives the wavelength variable interference filter and the imaging element based on the acquired drive pattern. In the second embodiment, after the wavelength variable interference filter 5 is driven, the stabilization of the gap dimension corresponding to a target wavelength is detected, and then the imaging element performs the photodetection process in response to the detected timing.

The second embodiment has the same configuration as in the first embodiment except for a point that a spectrometry apparatus is configured to detect the stabilization of the wavelength variable interference filter 5 instead of being configured to acquire the longest drive time in the first embodiment. In the following description, the same reference signs will be assigned to the same configurations as in the first embodiment, and the description thereof will be omitted or simplified.

Configuration of Spectrometry Apparatus

Figure 7:
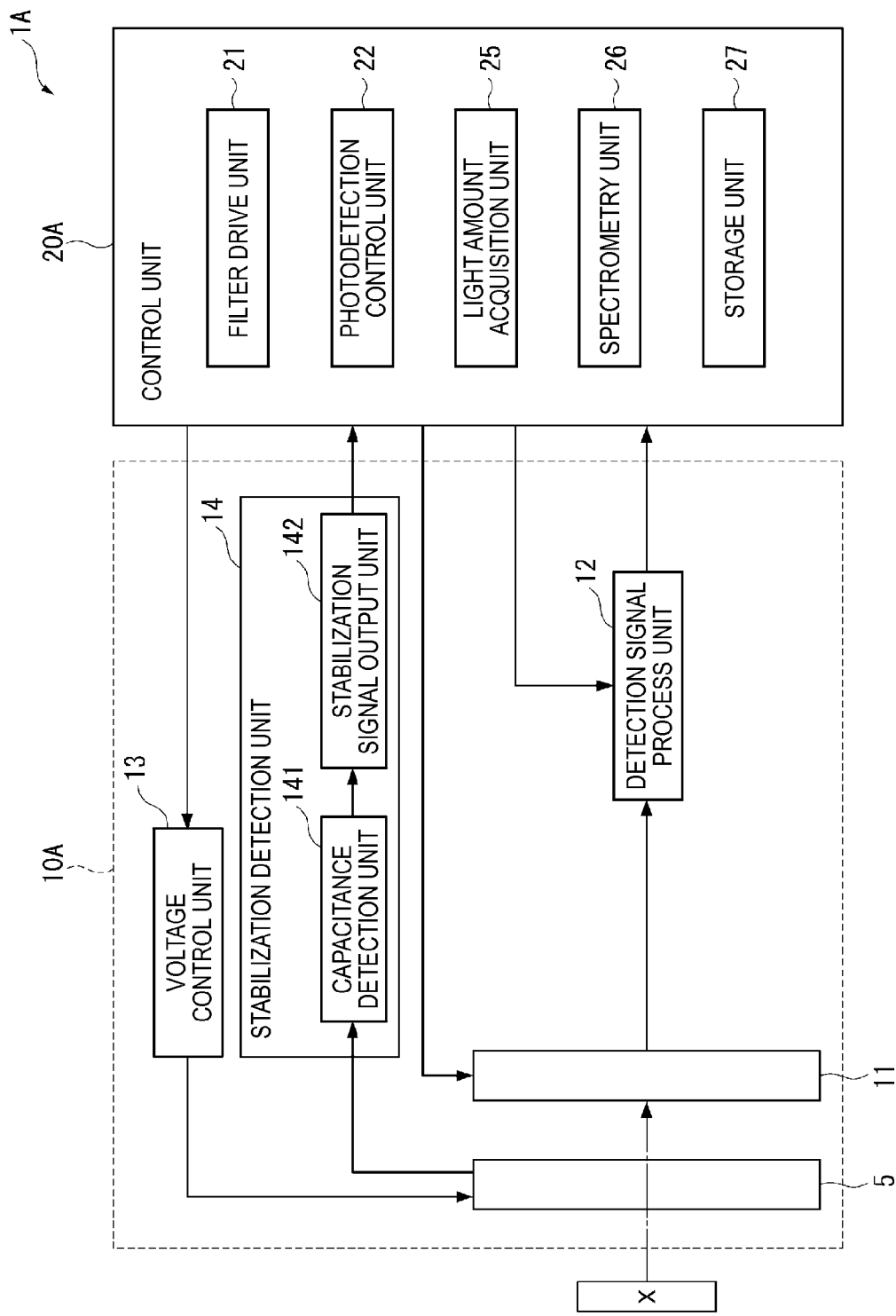
FIG. 7 is a block diagram illustrating the schematic configuration of a spectrometry apparatus of a second embodiment.

FIG. 7 is a block diagram illustrating the schematic configuration of the spectrometry apparatus of the second embodiment.

Figure 8:
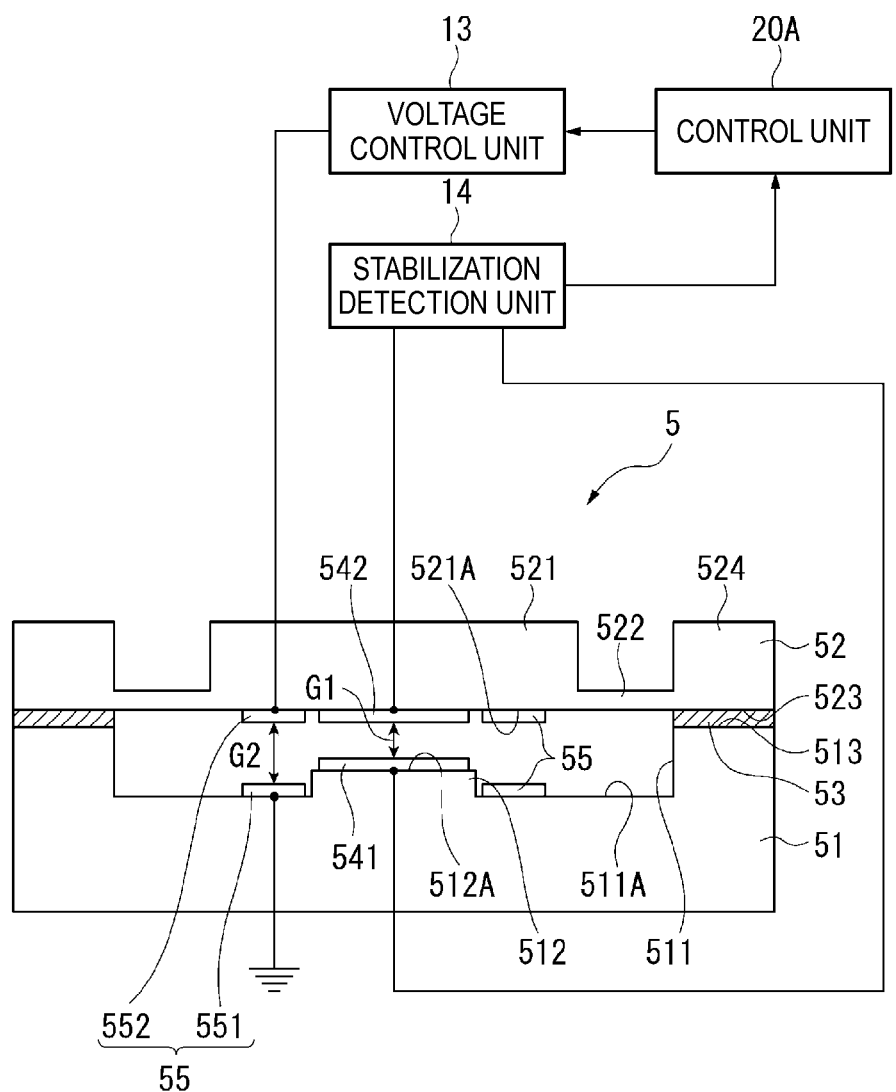
FIG. 8 is a view illustrating the schematic configuration of the wavelength variable interference filter.

FIG. 8 is a cross-sectional view illustrating the schematic configuration of the wavelength variable interference filter 5 of the second embodiment.

As illustrated in FIG. 7, a spectrometry apparatus 1A includes a spectroscopic module 10A and a control unit 20A.

Configuration of Spectroscopic Module

The spectroscopic module 10A includes at least the wavelength variable interference filter 5; the imaging element 11; the detection signal process unit 12; the voltage control unit 13; and a stabilization detection unit 14.

The stabilization detection unit 14 detects that the variation of the gap dimension of the wavelength variable interference filter 5 is settled, and the gap dimension is set to a set value. The stabilization detection unit 14 includes a capacitance detection unit 141 and a stabilization signal output unit 142.

As illustrated in FIG. 8, the capacitance detection unit 141 is connected to the reflective films 541 and 542. The capacitance detection unit 141 detects an electrostatic capacitance in response to the dimension of the gap G1 between the reflective films 541 and 542. The capacitance detection unit 141 includes a capacitance to voltage converter (C/V converter) and the like, and outputs a detection signal corresponding to the detected electrostatic capacitance.

When the electrostatic capacitance is a value in a range of predetermined threshold values, and the gap dimension is set to a value in a range of predetermined threshold set values, the stabilization signal output unit 142 detects the stabilization of the gap dimension, and outputs a stabilization signal based on the detection signal from the capacitance detection unit 141. The predetermined threshold value can be set to the range of the tolerances of the gap dimension required for obtaining a desired spectroscopic accuracy.

Figure 9:
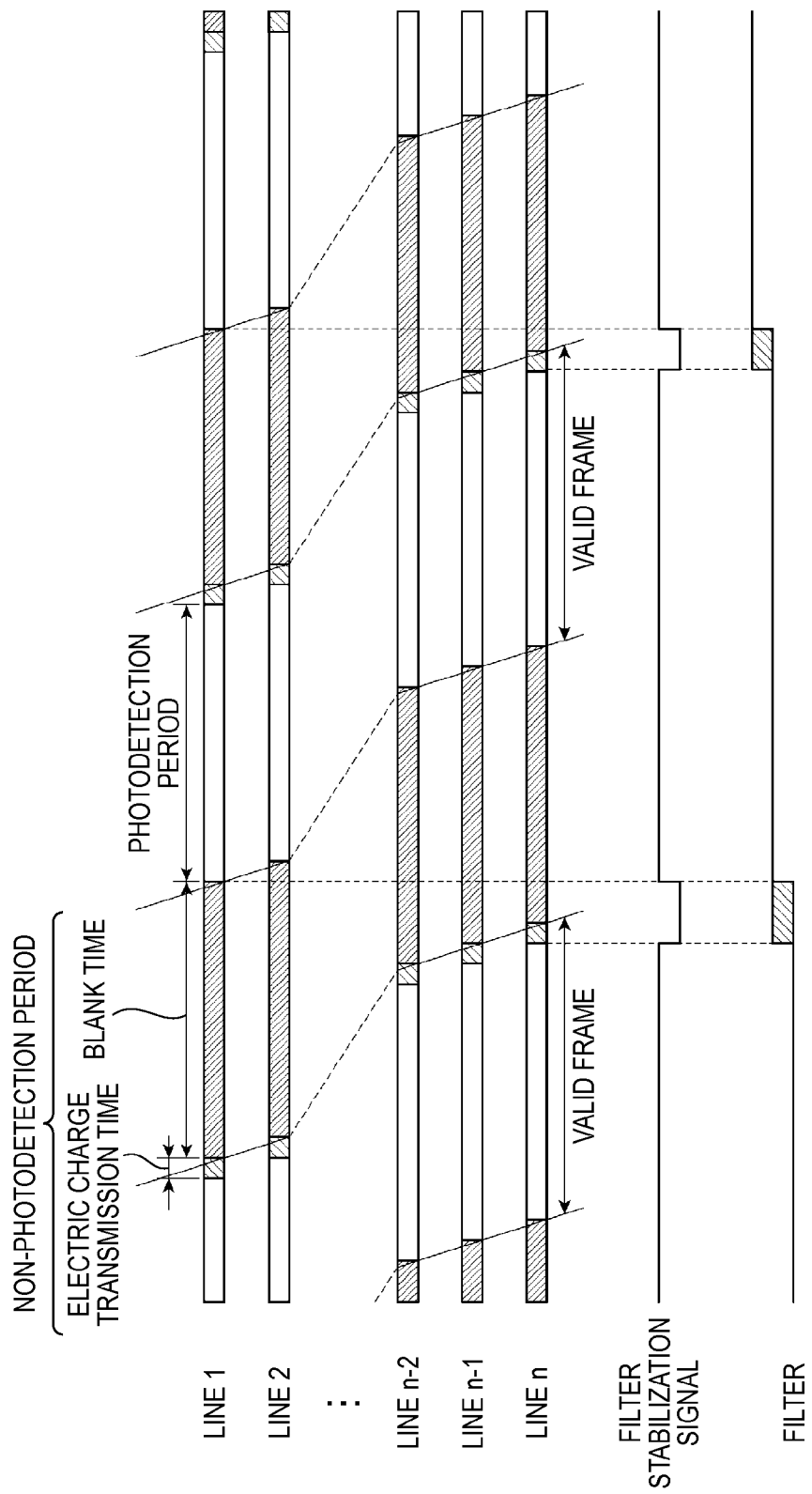
FIG. 9 is a chart illustrating the drive timing of the wavelength variable interference filter and the imaging element.

FIG. 9 is a chart illustrating a drive timing relationship between the wavelength variable interference filter 5 and the imaging element 11 in the second embodiment.

For example, as illustrated in FIG. 9, the stabilization signal output unit 142 outputs a Low signal when the gap dimension of the wavelength variable interference filter 5 is not stabilized at the set value, and a High signal when the gap dimension is stabilized at the set value.

Configuration of Control Unit

The control unit 20A includes the filter drive unit 21; the photodetection control unit 22; the light amount acquisition unit 25; the spectrometry unit 26; and the storage unit 27.

When the photodetection control unit 22 receives a stabilizing signal (High) indicative of the stabilization signal from the stabilization detection unit 14, the photodetection control unit 22 starts the photodetection period of the imaging element 11.

The imaging element control unit includes at least the stabilization detection unit 14, and further includes the photodetection control unit 22.

Operation of Spectrometry Apparatus

Subsequently, the operation of the spectrometry apparatus 1A will be described with reference to the accompany drawings.

Figure 10:
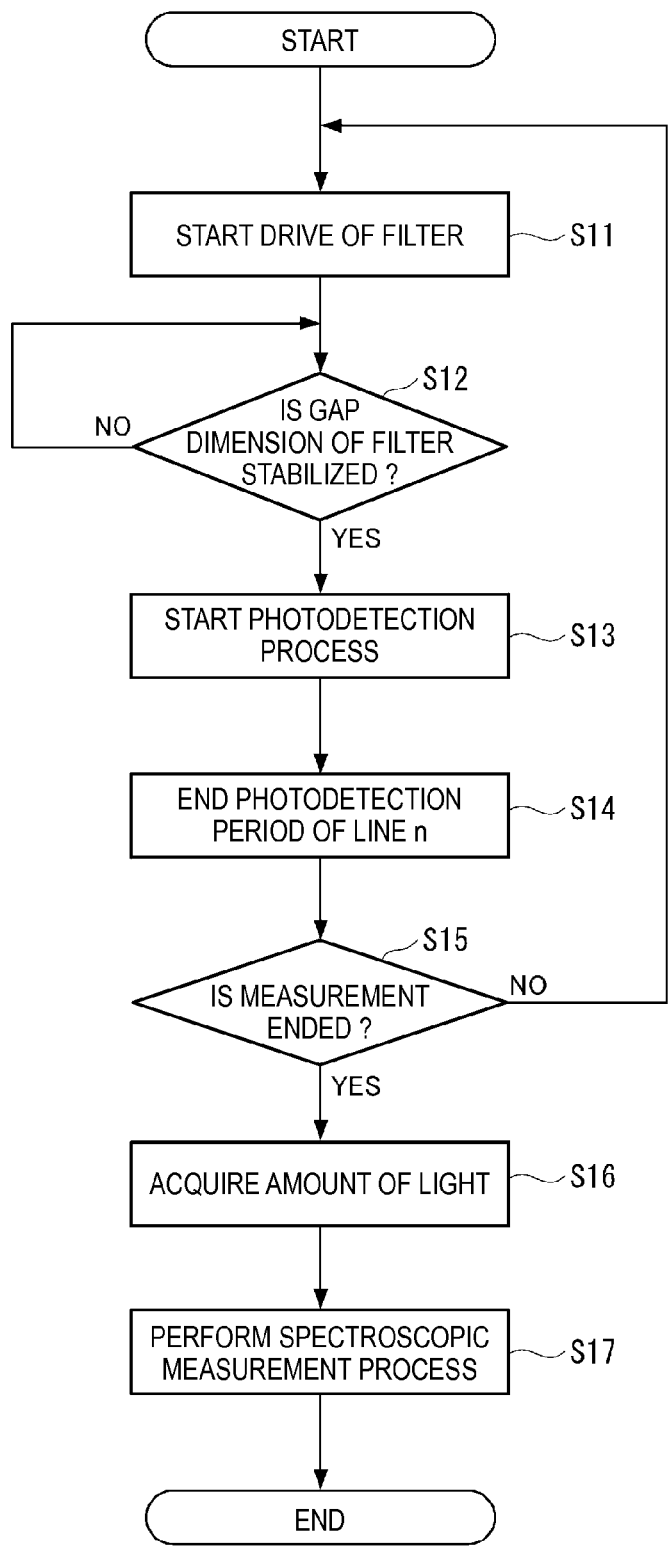
FIG. 10 is a flowchart illustrating an example of the spectrometry process of the spectrometry apparatus.

FIG. 10 is a flowchart illustrating an example of the operation of the spectrometry system.

First, similar to the first embodiment, a user operates the spectrometry apparatus 1A, and sets a measurement pattern.

When the measurement pattern is set, the filter drive unit 21 outputs a command signal to the voltage control unit 13, as per which a drive voltage corresponding to a target wavelength is applied to the electrostatic actuator 55 based on the measurement pattern, and starts the drive of the wavelength variable interference filter 5. Concurrently, the photodetection control unit 22 controls the imaging element 11 to transmit electric charges and output a detection signal (step S11). Similar to the first embodiment, the spectrometry apparatus 1A deletes electric charges transmitted immediately after the drive is started without referring to the electric charges as detected values.

Subsequently, the stabilization detection unit 14 detects that the gap dimension of the wavelength variable interference filter 5 is stabilized at the set value (step S12).

When the drive of the wavelength variable interference filter 5 is started, and the gap dimension of the wavelength variable interference filter 5 becomes the set value, and is stabilized, the state of the stabilizing signal output from the stabilization signal output unit 142 is changed from Low to High. In this manner, the stabilization detection unit 14 outputs a High stabilizing signal indicative of detecting the stabilization.

Here, while a Low stabilizing signal indicative of not detecting the stabilization is received, the photodetection control unit 22 continues the non-photodetection period in which electric charges are not accumulated. That is, as illustrated in FIG. 9, the photodetection control unit 22 controls the imaging element 11 in such a manner that electric charges are not accumulated for a time from the end of the electric charge transmission time to the end of the non-photodetection period, which is a blank time.

When the photodetection control unit 22 receives a High stabilizing signal indicative of detecting the stabilization from the stabilization detection unit 14, the photodetection control unit 22 controls the imaging element to start the photodetection process (step S13). The photodetection control unit 22 controls the imaging element 11 in such a manner that the photodetection process is performed after a predetermined time is delayed for each of the pixel rows (Line 1 to Line n).

When the photodetection period of the final pixel row (Line n) ends (step S14), and the measurement does not end at the measurement for the current set wavelength (No in step S15), the process returns step S11, and steps S11 to S15 are repeated. During this period, the photodetection control unit 22 controls the imaging element 11 to perform the electric charge transmission process for each of the pixel rows (Line 1 to Line n) in the non-photodetection period subsequent to the photodetection period.

In contrast, when the measurement ends at the measurement for the current set wavelength (Yes in step S15), similar to the first embodiment, the light amount acquisition unit 25 acquires the amount of light of the measurement wavelength, which transmits through the wavelength variable interference filter 5 based on the acquired signal (step S16).

The spectrometry unit 26 measures the spectral characteristics of the measurement target light based on the amount of light acquired by the light amount acquisition unit 25 (step S17).

As such, the spectrometry apparatus 1A acquires the spectral characteristics of the measurement target X based on the set measurement pattern.

Effects of Second Embodiment

In the spectrometry apparatus 1A, the photodetection period of the imaging element 11 starts at a time when the stabilization of the wavelength variable interference filter 5 is detected. Accordingly, it is possible to start the photodetection period at a time when the gap dimension of the wavelength variable interference filter 5 is stabilized, that is, when the spectroscopic element outputs emitted light of a stabilized wavelength. Accordingly, it is possible to precisely select the time required for each frame, and reduce the required time.

It is possible to start exposing the imaging element 11 to light at a time when the wavelength variable interference filter 5 is stabilized, and light of a predetermined wavelength can be emitted. Accordingly, it is possible to more reliably prevent the imaging element 11 from photodetecting light of wavelengths other than the predetermined wavelength, and it is possible to more reliably prevent a decrease in measurement accuracy.

In this configuration, the wavelength change driving is started along with the end of the photodetection period of the final pixel row (Line n) for a valid frame. Until the stabilization of the wavelength variable interference filter 5 is detected, the photodetection period of a subsequent frame does not start, and when the stabilization is detected, the accumulation of electric charges of the first pixel row (Line 1) for the subsequent frame starts. Accordingly, it is possible to set the length of the non-photodetection period (non-photodetection time) occurring for each of the pixel rows between valid frames to a length in response to a drive time. Since the accumulation of electric charges of the first pixel row (Line 1) for the subsequent frame is started at a time when the stabilization is detected, invalid frames do not occur. Accordingly, it is possible to optimize the time required for acquiring one frame, and reduce a measurement time. It is possible to more reliably prevent the imaging element 11 from photodetecting light of wavelengths other than the predetermined wavelength, and it is possible to more reliably prevent a decrease in measurement accuracy.

Modification of Embodiment

The invention is not limited to the embodiments and the modification example, and includes modifications and improvements insofar as an advantage of some aspects of the invention can be realized.

In the configuration of the first embodiment, the non-photodetection period is provided to the extent of the electric charge transmission time, however, the invention is not limited to the configuration in the first embodiment. In addition to the electric charge transmission time, a blank time in which electric charges are not accumulated may be appropriately provided. In this case, for example, it is possible to set a time to be long, in which the wavelength change driving may be performed even when the photodetection time is short. Even when the length of the photodetection time cannot be changed, it is possible to set an appropriate drive timing in response to the longest drive time.

In the configuration of the first embodiment, the valid frame and the invalid frame are alternately set, however, the invention is not limited to the configuration in the first embodiment, and a period equivalent to the invalid frame may be the non-photodetection period. In this case, since the period equivalent to the invalid frame is the non-photodetection period in the first embodiment, it is necessary to control the imaging element 11 for each frame. Accordingly, in the first embodiment, it is preferable that the imaging element 11 be continuously driven while setting the electric charge transmission time to the non-photodetection period and having the non-photodetection period and the photodetection period as one frame. For this reason, it is possible to easily control the imaging element 11.

In the configuration of the first embodiment, the longest drive time is acquired, and the drive timings of the wavelength variable interference filter 5 and the imaging element 11 are acquired based on the longest drive time, however, the invention is not limited to the configuration in the first embodiment, and the longest drive time may not be acquired.

For example, the drive timings (photodetection period and non-photodetection period) may be set in response to a drive pattern, and the wavelength variable interference filter 5 and the imaging element 11 may be driven based on the set drive pattern.

In the embodiments, the spectrometry apparatus 1 and the spectrometry apparatus 1A are exemplified, however, the invention can be applied to an analysis apparatus that analyzes the constituents of a measurement target.

In the respective configurations of the embodiments, the spectrometry apparatus 1 and the spectrometry apparatus 1A acquire a spectroscopic spectrum based on measurement results, however, the invention is not limited to the configurations in the embodiments, and the invention can be applied to are exemplified, however, the invention can be applied to a spectroscopic camera or the like, by which a spectroscopic image is acquired. That is, a detection signal may be selected for each pixel of each wavelength, and the spectroscopic image of each wavelength may be acquired based on the detection signal of the selected each pixel. A colorimetry process may be performed based on the acquired spectroscopic image. Even with this configuration, since a detection signal for each pixel is selected to correspond to the amount of light exposure in a suitable range of light exposure, it is possible to acquire a high-precision spectroscopic image, and perform a high-precision colorimetry process.

In the embodiments, the wavelength variable interference filter 5 may be built into each of the spectroscopic modules 10 and 10A in a state where the wavelength variable interference filter 5 is accommodated in a package. In this case, it is possible to improve drive responsiveness when a voltage is applied to the electrostatic actuator 55 of the wavelength variable interference filter 5 by vacuum-sealing the package.

In the respective configurations of the embodiments, the wavelength variable interference filter 5 includes the electrostatic actuator 55 that varies the gap dimension between reflective films 541 and 542 when a voltage is applied thereto, however, the invention is not limited to the configurations.

For example, a dielectric actuator may be used in which a first dielectric coil is disposed instead of the fixed electrode 551, and a second dielectric coil or a permanent magnet is disposed instead of the movable electrode 552.

In addition, a piezoelectric actuator may be used instead of the electrostatic actuator 55. In this case, it is possible to expand and contract a piezoelectric film, and bend the holding portion 522 by disposing a lower electrode layer, the piezoelectric film, and an upper electrode layer in the holding portion 522 in a laminated manner, and being able to change a voltage applied between the lower electrode layer and the upper electrode layer as an input value.

In the wavelength variable interference filter 5 of the embodiments, the fixed substrate 51 and the movable substrate 52 as Fabry-Perot etalons are bonded together while facing each other, and the fixed reflective film 541 is provided on the fixed substrate 51, and the movable reflective film 542 is provided on the movable substrate 52, however, the invention is not limited to the configuration.

For example, the fixed substrate 51 and the movable substrate 52 may not be bonded together, and a gap changing portion for changing a gap between the reflective films such as a piezoelectric element may be provided between the substrate.

The invention is not limited to the configuration that includes two substrates. For example, a wavelength variable interference filter may be used, which is formed by laminating two reflective films on one substrate with a sacrifice layer interposed between the reflective films, and removing the sacrifice layer via etching or the like.

In the embodiments, the wavelength variable interference filter 5 is exemplified as the spectroscopic element, however, the invention is not limited to the wavelength variable interference filter 5, and for example, an acousto optic tunable filter (AOTF) or a liquid crystal tunable filter (LCTF) may be used as the spectroscopic element. As in the embodiments, a Fabry-Perot filter is preferably used from the perspective of reducing the size of the apparatus.

In addition, the specific embodied structure of the invention may be formed by appropriately assembling together the embodiments and the modification example insofar as an advantage of some aspect of the invention can be realized, and may be appropriately changed to other structures.

The entire disclosure of Japanese Patent Application No. 2013-270761 filed on Dec. 27, 2013 is expressly incorporated by reference herein.

What is claimed is:

1. An optical module comprising:
a spectroscopic element that selects light of a predetermined wavelength from incident light, and emits the selected light as emitted light, the spectroscopic element being operable to emit light having one of a plurality of wavelengths;
a roll shutter imaging element that has pixels which accumulate electric charges while being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period; and
a spectroscopic controller that controls the wavelength change driving of the emitted light in the spectroscopic element,
wherein for the one frame, the spectroscopic controller controls the spectroscopic element to start the wavelength change driving at an end timing of the photodetection period of a final pixel block for which the photodetection process is performed at the end.

2. The optical module according to claim 1,
wherein an end timing of the non-photodetection period of a first pixel block for which the photodetection process is initially performed in a second frame subsequent to a first frame comes after an end timing of the wavelength change driving that is started along with the end of the photodetection period of the final pixel block for the first frame.

3. The optical module according to claim 2,
wherein an end timing of the non-photodetection period of the first pixel block for the second frame is a time when the photodetection period of the final pixel block for the first frame ends and then a longest drive time elapses among available drive times for the wavelength change driving.

4. The optical module according to claim 3,
wherein the longest drive time is the longest of the drive times for the wavelength change driving in which an amount of changing the wavelength is a predetermined amount or less.

5. The optical module according to claim 4,
wherein the spectroscopic controller controls the spectroscopic element to perform stepwise driving, by which the wavelength of the emitted light is sequentially changed to each of a plurality of wavelengths between a first wavelength and a second wavelength in an increasing direction or a decreasing direction, the second wavelength being shorter than the first wavelength.

6. The optical module according to claim 1, further comprising:
a stabilization detector that detects a stabilization state at which time the amount of variation of the wavelength of the emitted light in the spectroscopic element falls into a range of predetermined threshold values; and
an imaging element controller that starts the accumulation of electric charges in a first pixel block at the time of the stabilization state of the spectroscopic element, at which the wavelength change driving is started along with the end of the photodetection period of the final pixel block for which the photodetection process is performed at the end for the one frame, in which the photodetection process is initially performed for the first pixel block.

7. An electronic apparatus comprising:

an optical module including:
- a spectroscopic element that selects light of a predetermined wavelength from incident light, and emits the selected light as emitted light, the spectroscopic element being operable to emit light having one of a plurality of wavelengths,
- a roll shutter imaging element that has pixels which accumulate electric charges while being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period, and
- a spectroscopic controller that controls the wavelength change driving of the emitted light in the spectroscopic element, in which the spectroscopic controller controls the spectroscopic element to start the wavelength change driving at an end timing of the photodetection period of a final pixel block for which the photodetection process is performed at the end for the one frame; and a controller that controls the optical module.

8. A method of driving an optical module including a spectroscopic element that selects light of a predetermined wavelength from incident light, and emits the selected light as emitted light, the spectroscopic element being operable to emit light having one of a plurality of wavelengths, and

- a roll shutter imaging element that has pixels which accumulate charges while being exposed to the emitted light, and forms one frame by performing a photodetection process for each pixel block including a plurality of the pixels with a predetermined time delay for each pixel block, in which the imaging element accumulates electric charges in the pixels in a photodetection period, and outputs a detection signal in response to the accumulated electric charges in a non-photodetection period subsequent to the photodetection period, the method comprising:

accumulating electric charges in the pixels with a predetermined time delay for each of the pixel blocks for the one frame; and controlling the spectroscopic element to start the wavelength change driving of the emitted light at an end timing of the photodetection period of a final pixel block for which the photodetection process is performed at the end for the one frame.

* * * * *